(No Model.) 2 Sheets—Sheet 1.

J. W. R. JOHNSON.
DIE FOR WELDING LINKS.

No. 499,229. Patented June 13, 1893.

Witnesses:
Sidney P. Hollingsworth
B. Washington Miller

Inventor
John W. R. Johnson
by his attorneys
Baldwin Davidson Wight (No Model.) 2 Sheets—Sheet 2.
J. W. R. JOHNSON.
DIE FOR WELDING LINKS.
No. 499,229. Patented June 13, 1893.
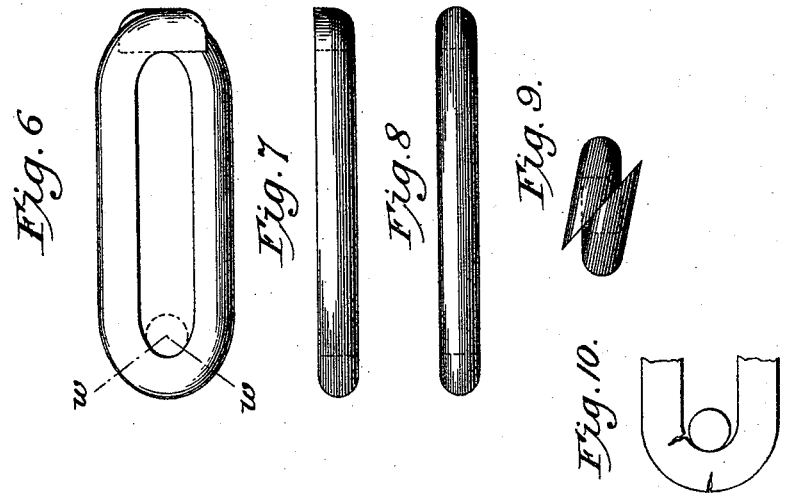
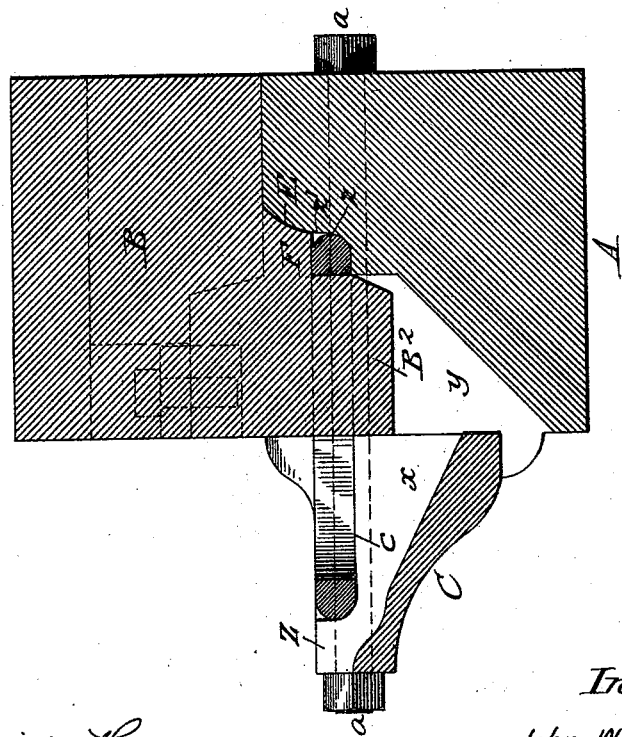
Witnesses
Inventor
John W. R. Johnson
by his attorneys

UNITED STATES PATENT OFFICE.

JOHN W. R. JOHNSON, OF RICHMOND, VIRGINIA, ASSIGNOR TO THE TREDEGAR COMPANY, OF SAME PLACE.

DIE FOR WELDING LINKS.

SPECIFICATION forming part of Letters Patent No. 499,229, dated June 13, 1893.

Application filed April 20, 1892. Serial No. 429,881. (No model.)

*To all whom it may concern:*

Be it known that I, JOHN W. R. JOHNSON, a citizen of the United States, residing at Richmond, in the county of Henrico and State of Virginia, have invented certain new and useful Improvements in Dies for Welding Links, of which the following is a specification.

My invention relates especially to dies constructed and arranged for welding car-coupling links.

The object of my invention is to so form dies of this kind that they shall not only be simple in construction, durable and easily operated, but shall also be most efficient, and shall weld or unite the scarfed ends of the link-blank perfectly, without producing fins or other irregularities.

In carrying out my invention, I employ two die-blocks, one of which is formed with a recess or seat for the link, and the other with projections adapted to co-operate with the recess in uniting the ends of the link, and properly shaping it. I so form the recess as to accommodate the projecting scarfed ends of the link-blank, when it is first inserted, but the formation is such as to permit of the link's being welded into proper form when the dies are operated.

Figure 2:
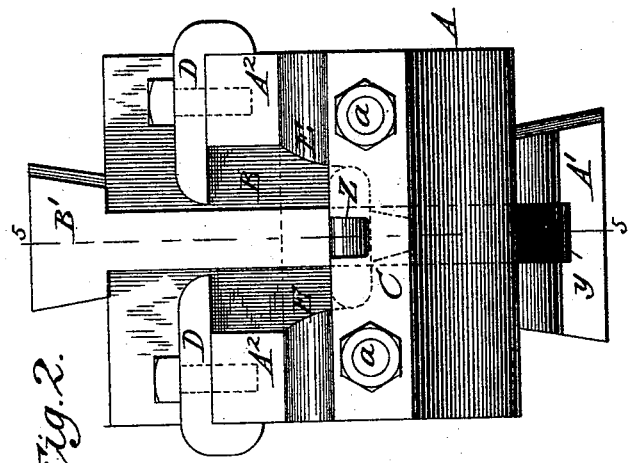
Figure 4:
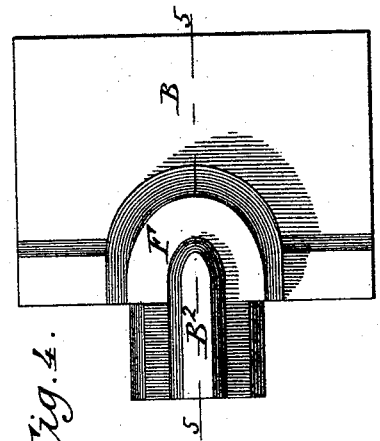
Figure 1:
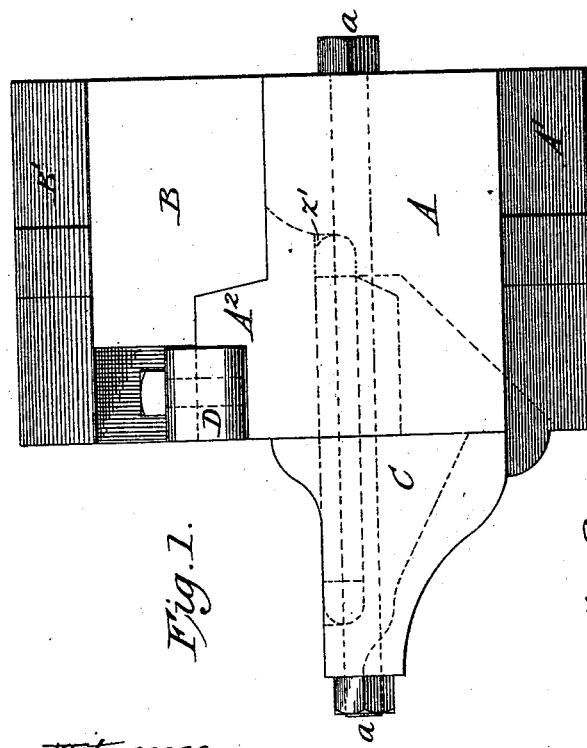
Figure 3:
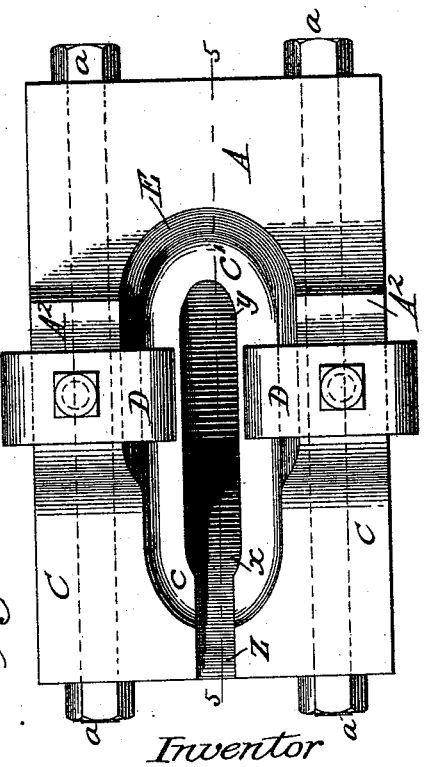

In the accompanying drawings—Figure 1 is a side elevation of dies embodying my improvements. Fig. 2 is a front elevation. Fig. 3 is a plan view of the lower die-block. Fig. 4 is an inverted plan view of the upper die-block. Fig. 5 is a vertical, central section, on the line 5—5 of Figs. 2, 3 and 4. Fig. 6 is a plan view of a link before it is operated upon by the dies. Fig. 7 is a side elevation of the link as it appears after the first blow of the dies. Fig. 8 is a side elevation of the completed link. Fig. 9 is a view of the scarfed end of the link, before being operated upon by the dies. Fig. 10 is a plan view of one end of a link of ordinary formation, showing the points where in practice it is apt to break.

I employ two dies, A and B. To the lower die, A, is secured by bolts $a$, a stop or support C, properly recessed at $c$, to accommodate one end of the link. It is obvious that the support C, may be formed integrally with the block A, but I prefer to make it in a separate piece and secure it by bolts, as indicated.

The block A, is formed with a dove-tail projection A′, by means of which it may be readily secured to a base or support in the usual way. It is also provided at its front end with pillars A², on which are mounted strippers D, which detach the link and cause it to drop should it rise when the upper die is lifted.

The two dies are suitably shaped to interlock with each other, but they interlock in such manner as to admit of a free vertical movement of the upper die. This die, at its upper end, has a dove-tail projection B′, which may be secured to any suitable means for raising and lowering it. It has, at its lower end, a projection B², which extends through an opening in the lower die; it is also adapted to extend through the link and project a short distance below it.

The support or stop C, and the lower die A, are provided with openings $x$, $y$, through which scale may be discharged. The particular formation of the recess or cavity for the link is important in my dies. As shown in Fig. 3, there is a recess $c$, $c'$, for the entire link on the lower die, and on the support C, and this recess connects with an outwardly-curved portion E, particularly shown in Figs. 3 and 5, to accommodate the scarfed ends of the link.

As shown in Fig. 5, the recess $c'$, is concave to the point $z$, and then the lines of the walls are curved outwardly or convexed. By this arrangement, a space $z'$, is left to accommodate the scarfed ends, shown in Fig. 6, and to also accommodate the surplus metal which is formed as indicated at 1, Fig. 7, after the first blow. The upper die is suitably shaped to fit neatly over the end of the link, and to make proper joints with the lower die. A projection F, bears upon the top of the link and presses it into the recess in the lower die, the projection B², extending through the link and supporting it on its inner sides.

The link may be manipulated by the tongs of the operator, through the opening Z. The link-blank shown in Fig. 6, is first seated in the lower die, while the upper die is lifted; when the upper die is lowered or forced down, the link is welded to the shape shown in Fig. 7, the surplus metal being forced into the space $z'$; the upper die is then lifted and the link is turned over and seated again in the lower die; the upper die is then lowered and welds the link to the form shown in Fig. 8. By the second blow of the upper die, the surplus metal shown at 1 in Fig. 7, is welded into the body of the link, and a perfect formation results, there being no fins or other irregularities upon the completed link.

The link shown in Fig. 6, is of a novel construction. It will be seen that the curved inner portions of the link at each end in which the coupling-pin is seated when in use, are made to correspond with the curvature of the pin. The lines $w, w$, are struck from a center corresponding with the axis of the pin, and thus there is not that unequal strain that there is in links as commonly formed, and as illustrated in Fig. 10.

I have shown in Fig. 10, the points where it is found links are apt to break when the curved end is of the usual formation, and it is not made to fit or correspond with the curvature of the pin, as I have shown it. The dies which I employ are preferably so shaped as to form links of the improved character indicated.

It is obvious that the dies may be reversed, and the recesses and cavities may be in the upper die instead of in the lower die; I prefer, however, the construction illustrated.

I claim as my invention—

1. The combination of the lower die having the pillars $A^2$, the strippers secured to the pillars and projecting inwardly toward each other therefrom, and the upper die co-operating with the lower die, and movable vertically between the strippers, substantially as described.

2. The combination with a die having a projection adapted to extend through the link, and a projection adapted to bear upon one side of one end of the link, another die having a recess suitably shaped to accommodate one end of the link and arranged adjacent to the projection of the first mentioned die, and a forwardly projecting support or stop forming a continuation of the recess and shaped to receive that end of the link opposite the end adjacent to the upper die.

3. The combination of the lower die having a recess adapted to receive the end of the link to be welded, a support or stop having a recess communicating with the first mentioned recess and forming therewith a recess corresponding approximately to the shape of the completed link, a discharge opening communicating with said recess, and another die having a projection extending into said discharge opening and formed with a projection to bear upon the end of the link to be welded, substantially as described.

4. The combination with the lower die and the support C, which together have a recess $c\ c'$ therein for the entire link, the portion of the recess $c'$ being concave from its lower end to the point $z$ and then curved outwardly or convex as described, and connecting with the outwardly curved portion E, whereby a space $z'$ is left to accommodate the scarfed ends of the link to be welded and also to accommodate surplus metal which is formed under the first blow, and the upper die shaped to fit neatly over that end of the link to be welded and having a projection F, bearing upon the top of the link to press it into the recess in the lower die and a projection $B^2$ extending through the link and supporting it on its inner sides near the end to be welded.

In testimony whereof I have hereunto subscribed my name.

JOHN W. R. JOHNSON.

Witnesses:
G. B. HOBSON,
J. B. I. ANDERSON.